United States Patent
Thomas et al.

(10) Patent No.: US 9,938,132 B2
(45) Date of Patent: Apr. 10, 2018

(54) DISPENSING DEVICE AND GROUP OF SUCH DISPENSING DEVICES

(71) Applicant: PCM Technologies, Levallois-Perret (FR)

(72) Inventors: Jeremy Thomas, Saumur (FR); Manuel Brule, La Pommeraye (FR)

(73) Assignee: PCM TECHNOLOGIES, Levallois-Perret (FR)

( * ) Notice: Subject to any disclaimer, the term of this patent is extended or adjusted under 35 U.S.C. 154(b) by 319 days.

(21) Appl. No.: 14/722,842

(22) Filed: May 27, 2015

(65) Prior Publication Data
US 2015/0344291 A1    Dec. 3, 2015

(30) Foreign Application Priority Data
May 28, 2014 (FR) .................................. 14 54896

(51) Int. Cl.
*B67D 7/84* (2010.01)
*B65B 39/00* (2006.01)
(Continued)

(52) U.S. Cl.
CPC .............. *B67D 7/84* (2013.01); *B65B 39/004* (2013.01); *A23G 9/30* (2013.01); *B65B 3/30* (2013.01); *B65B 3/32* (2013.01); *F16K 31/00* (2013.01)

(58) Field of Classification Search
CPC .. B67D 7/84; B67D 5/52; F16K 27/00; F16K 31/00; A23G 9/30; A23G 9/00;
(Continued)

(56) References Cited

U.S. PATENT DOCUMENTS 3,612,363 A * 10/1971 Carter ................... B65B 39/004
                                                222/426
4,079,864 A * 3/1978 Cox ........................ F16N 25/02
                                                  184/29
(Continued)

FOREIGN PATENT DOCUMENTS

DE           3943149 C1     1/1991
DE        19730037 A1     1/1999
(Continued)

OTHER PUBLICATIONS

French National Institute of Industrial Property (INPI), French Preliminary Search Report issued in corresponding French Application No. FR1454896, dated Jan. 20, 2015.
(Continued)

*Primary Examiner* — Nicholas J Weiss
*Assistant Examiner* — Andrew P Bainbridge
(74) *Attorney, Agent, or Firm* — Patzik, Frank & Samotny Ltd.

(57) ABSTRACT

The invention relates to a dispensing device for flowable products, the dispensing device comprising: at least a first and second plugs adapted to allow or prevent the flow of product; a first guide block comprising a guide hole adapted to guide the first plug, and a channel in communication with the guide hole, that allows the passage of maintenance fluid; a second guide block isolated from the first guide block, the second guide block comprising a guide hole able to guide the second plug, and a channel for passage of maintenance fluid, and a coupling adapted to connect in a fluidtight manner the channel of the first guide block to the channel of the second guide block, in order to allow the passage of maintenance fluid.

20 Claims, 13 Drawing Sheets

(51) Int. Cl.
*A23G 9/30* (2006.01)
*B65B 3/32* (2006.01)
*F16K 31/00* (2006.01)
*B65B 3/30* (2006.01)

(58) Field of Classification Search
CPC ......... B65B 39/004; B65B 39/14; B65B 3/04; B65B 3/32; B65B 1/04; B65B 37/00; B65B 43/42; B65B 3/30
USPC .......... 222/173, 63, 333–334, 504–505, 509; 141/152, 177, 237, 242; 137/883–884
See application file for complete search history.

(56) References Cited

U.S. PATENT DOCUMENTS

| | | | | |
|---|---|---|---|---|
| 4,151,698 A | * | 5/1979 | Muller | B65B 3/04 53/131.2 |
| 4,341,329 A | * | 7/1982 | Kuemmerer | B65B 39/004 141/235 |
| 4,942,910 A | * | 7/1990 | Hamamura | A23G 9/288 141/105 |
| 4,997,014 A | * | 3/1991 | Weiler | B65B 3/36 137/883 |
| 5,027,978 A | * | 7/1991 | Roeser | B29B 7/749 222/137 |
| 5,127,449 A | * | 7/1992 | Mueller | B65B 3/32 141/1 |
| 5,305,809 A | * | 4/1994 | Pringle | B67C 3/26 141/157 |
| 5,524,683 A | * | 6/1996 | Mueller | B65B 3/32 141/129 |
| 5,730,174 A | * | 3/1998 | Mismas | F15B 13/044 137/269 |
| 5,865,224 A | * | 2/1999 | Ally | B65B 3/34 141/130 |
| 6,726,065 B2 | * | 4/2004 | Sanders | G01F 11/22 222/333 |
| 7,108,024 B2 | * | 9/2006 | Navarro | B65B 3/12 134/169 C |
| 7,289,878 B1 | * | 10/2007 | Estelle | B05C 5/02 222/1 |
| 7,322,310 B2 | * | 1/2008 | McKay | A23G 9/24 118/13 |
| 8,596,313 B2 | * | 12/2013 | Le Roi | B65B 3/06 141/105 |
| 8,656,942 B2 | * | 2/2014 | Wong | F16L 29/007 137/315.17 |
| 9,163,740 B2 | * | 10/2015 | Hartwig | C03B 9/3636 |
| 2009/0321475 A1 | * | 12/2009 | Schultz | F04B 13/00 222/52 |
| 2010/0140289 A1 | * | 6/2010 | Knobel | B05C 9/06 222/1 |
| 2011/0139814 A1 | * | 6/2011 | Mueller | F04B 7/0011 141/1 |
| 2015/0344291 A1 | * | 12/2015 | Thomas | B65B 39/004 222/173 |
| 2016/0037963 A1 | * | 2/2016 | Tuchrelo | A47J 31/60 222/148 |
| 2016/0146201 A1 | * | 5/2016 | Van Keulen | F16N 7/32 222/333 |

FOREIGN PATENT DOCUMENTS

| | | |
|---|---|---|
| EP | 0271242 A1 | 6/1988 |
| EP | 0401510 A1 | 12/1990 |
| EP | 0742147 A1 | 11/1996 |

OTHER PUBLICATIONS

English Translation of Abstract for German Publication No. DE19730037(A1).
English Translation of Abstract for European Publication No. EP0742147(B1).
English Translation of Abstract for German Publication No. DE3943149(C1).
English Translation of Abstract of European Publication No. EP0401510(A).

* cited by examiner

DISPENSING DEVICE AND GROUP OF SUCH DISPENSING DEVICES

RELATED APPLICATIONS

This invention claims priority to French patent application No. FR 14 54896, filed May 28, 2014, the entirety of which is hereby incorporated by reference.

FIELD OF THE INVENTION

The invention relates to a dispensing device for flowable products such as, for example, pasty or liquid products or granules, and to a group of such dispensing devices.

The invention also relates to a group comprising at least two dispensing devices.

BACKGROUND OF THE INVENTION

There are known dispensing devices of the type having a frame comprising a support plate mounted on feet and a plug-support plate able to move relative to the support plate. The support plate supports, on its upper face, a single guide block comprising guide holes, and, on its lower face, dispensing nozzles. The plug-support plate carries plugs.

The dispensing nozzles are formed of a nozzle body suitable for dispensing the product to be dispensed and an entry channel connected to the nozzle body. The plugs are adapted to move in the dispensing nozzle between a position where they close the entry channel and a position where the entry channel is in communication with the nozzle body. The guide holes guide the plugs as they move. The guide block further comprises plug cleaning and lubrication chambers. These chambers are interconnected by external connecting hoses.

The guide block is fastened to the support plate by at least one screw and a locking means, or by a plurality of screws. When the guide block is leaking, the entire support plate must be disassembled in order to remove the guide block. Once the guide block is disassembled, it is difficult to find the leak.

SUMMARY OF THE INVENTION

The object of the invention is to provide a dispensing device that is easier to disassemble and where leak detection is improved. Another object of the invention is to provide a compact dispensing device.

The invention therefore relates to a dispensing device for flowable product, said dispensing device comprising:
- a frame comprising a support plate;
- at least first and second plugs carried by the frame, the first and second plugs being adapted to allow or prevent the flow of product;
- a first guide block supported by the support plate, said first guide block comprising a guide hole adapted to guide the first plug, and a channel in communication with the guide hole, that allows the passage of a maintenance fluid;
- a second guide block supported by the support plate, said second guide block being isolated from the first guide block, the second guide block having a guide hole adapted to guide the second plug, and a channel for the passage of maintenance fluid; and
- a coupling supported by the support plate, said coupling being adapted to connect in a fluidtight manner the channel of the first guide block to the channel of the second guide block, in order to allow the passage of maintenance fluid.

This invention simplifies maintenance of the dispensing device. When a seal deteriorates, determining the deteriorated seal is simplified because one simply needs to look for the location of the leak on the support plate. Removal of the deteriorated seal is accelerated because only the guide block containing the leaking seal needs to be disassembled.

According to certain embodiments, the dispensing device comprises one or more of the following features:
- the channel of the first guide block opens onto one face, referred to as the contact face, which lies in a plane substantially parallel to the support plate.

Advantageously, the connection between the coupling and the guide block is done in a horizontal plane. This allows securing the coupling to the guide block without imposing stringent tolerance limits on the dimensions and positioning of the coupling and the guide block.
- at least a portion of the first guide block rests on at least a portion of a base face of the coupling, said coupling comprising a channel having a first opening which opens onto said at least a portion of the base face.

Advantageously, this assembly is compact and the coupling is held in position during the assembly phase by the pressure exerted thereon by the two guide blocks adjacent to the coupling.
- the dispensing device comprises an additional coupling having a base face; the other portion of the first guide block resting on at least a portion of the base face of the additional coupling, said channel having a second opening which opens onto said at least a portion of the base face of said additional coupling.
- the dispensing device comprises at least a first and second dispensing nozzles supported by the support plate, each dispensing nozzle having a nozzle body adapted to dispense the product and an entry channel coupled to the nozzle body;

and wherein the support plate comprises openings provided with a shoulder, the first and second dispensing nozzles being fitted into said openings, and the first guide block being secured to the first dispensing nozzle by at least one fastening element; the first dispensing nozzle abutting against said shoulder of the support plate; the coupling being wedged between the first guide block, the first dispensing nozzle, and the support plate.

The number of fastening elements to be disassembled is therefore advantageously decreased.
- the dispensing device comprises at least one sealing device interposed between the coupling and the first guide block, and wherein at least one face among the face of the guide block resting against the coupling and the base face, comprises a circular groove in which said seal is seated, the sealing device being compressed by said at least one fastening element Advantageously, the sealing device is compressed on the one hand by the weight of the guide block, and on the other hand by the device attaching the guide block to the dispensing nozzle.
- the dispensing device comprises two fastening elements fastening the first guide block to the first dispensing nozzle, and wherein the channel of the first guide block comprises a delivery path and a discharge path which open onto the guide hole, one on either side of said hole along a diagonal of the contact face, and wherein the two fastening elements are arranged one on either side of the guide hole, along a second diagonal of said contact face.

Advantageously, this assembly is compact and stable.

each plug comprises at least an upper portion, a groove for receiving a fastening wedge, and a lower portion separated from the upper portion by said groove, and wherein the diameter of the upper portion is less than or equal to the diameter of the lower portion Advantageously, this feature allows disassembling or assembling the plugs by passing them under the dispensing device by sliding the plugs through the guide holes and dispensing nozzles.

the dispensing device comprises a static sealing device arranged between the first guide block and the first dispensing nozzle.

Advantageously, this sealing device is easily accessible since only the first guide block must be disassembled in order to access it.

the nozzle body comprises a central hole provided with an internal shoulder, the first guide block comprising a lower end face resting against said internal shoulder, and wherein at least one face among a face of the internal shoulder and the lower end face is provided with a groove, the static sealing device being seated in said groove.

Advantageously, the first guide block compresses this static seal when the first guide block is attached to the first dispensing nozzle.

the first guide block is identical to the second guide block.

The first guide block and second guide block are thus interchangeable. The guide blocks can be mass produced at low cost.

the coupling comprises a passageway for fluid that is generally U-shaped.

the coupling is made of elastomer.

Said guide holes extend along a main axis and wherein said channel (41) comprises at least a section extending parallel to the main axis and a section extending in a direction forming a predetermined angle α, θ with said main axis; said predetermined angle α, θ being between 55° and 85°.

one among the support plate and the coupling comprises at least one positioning relief element and the other at least one positioning relief element of complementary shape.

This device allows holding the coupling in position relative to the support plate during the phases of assembling or disassembling the guide blocks or dispensing nozzles.

said guide hole of the first guide block comprises at least one constriction provided with a groove, and wherein the first guide block comprises at least one dynamic sealing device arranged in said groove and adapted to establish fluidtightness between the first plug and the first guide block.

Advantageously, the upper and lower dynamic sealing devices can be easily removed by simply disassembling the fastening element attaching the first guide block to the first dispensing nozzle.

Advantageously, the lower sealing device provides a dynamic seal between the inside space of the guide hole and the first dispensing nozzle, and the upper sealing device provides a dynamic seal between the inside space of the guide hole and the outside of the first guide block.

the contact face of the first guide block comprises an assembly-assisting relief element.

To be certain that the cleaning and/or lubrication chamber is properly emptied, it is desirable that the guide block be mounted with its delivery path oriented toward the inlet block and its discharge path oriented toward the outlet block. As the guide block is symmetric, an assembly-assisting relief element advantageously allows distinguishing the contact face where the discharge path discharges.

the plugs are arranged in 2n rows where n is an integer greater than 1, the plugs of n row(s) being moved by a first actuator and the plugs of the next n rows being moved by another actuator independent of said first actuator.

Advantageously, this dispensing device can be used to fill either 2n or n rows of product. In the latter case, only two out of four rows of dispensing nozzles are used.

Advantageously, this dispensing device can be used to fill the first n rows with a first product, for example yogurt, and the next n rows with another product, for example mousse. In this case, the belt of the conveyor moves for a distance corresponding to the distance between the first and third row of dispensing nozzles, in each fill cycle.

The invention also relates to a set of dispensing devices, characterized in that it comprises at least a first dispensing device and second dispensing device according to claim 1, wherein the center-to-center distance between the plugs of the first dispensing device is different from the center-to-center distance between the plugs of the second dispensing device and wherein the guide blocks of the first dispensing device are identical to the guide blocks of the second dispensing device.

Advantageously, the dispensing device according to the invention is modular. The same guide blocks and the same dispensing nozzles can be mounted on various dispensing devices. In particular, they can be mounted on dispensing devices having different support plates and having a different center-to-center distance between plugs. Only the support plate, protective plate, connectors, and plug-support plate are adapted according to the containers for the product to be dispensed. This modularity reduces the manufacturing costs of the dispensing devices and allows the user to use a large portion of the components of one dispensing device for another dispensing device.

BRIEF DESCRIPTION OF THE DRAWINGS

The invention will be better understood from reading the following description, given solely by way of example and with reference to the figures in which.

DETAILED DESCRIPTION OF THE INVENTION

Figure 1:
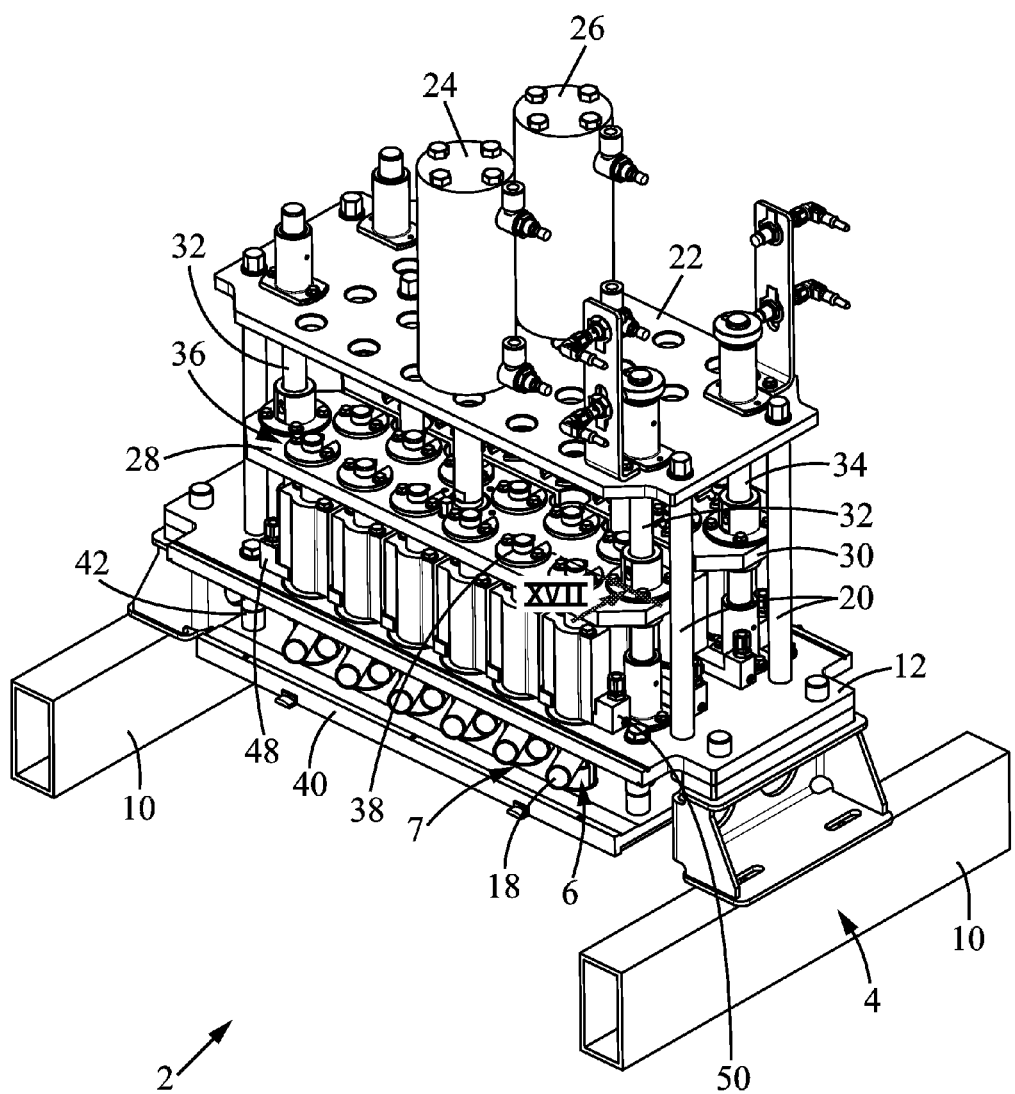
FIG. 1 is a perspective view of the dispensing device according to the invention.
Figure 2:
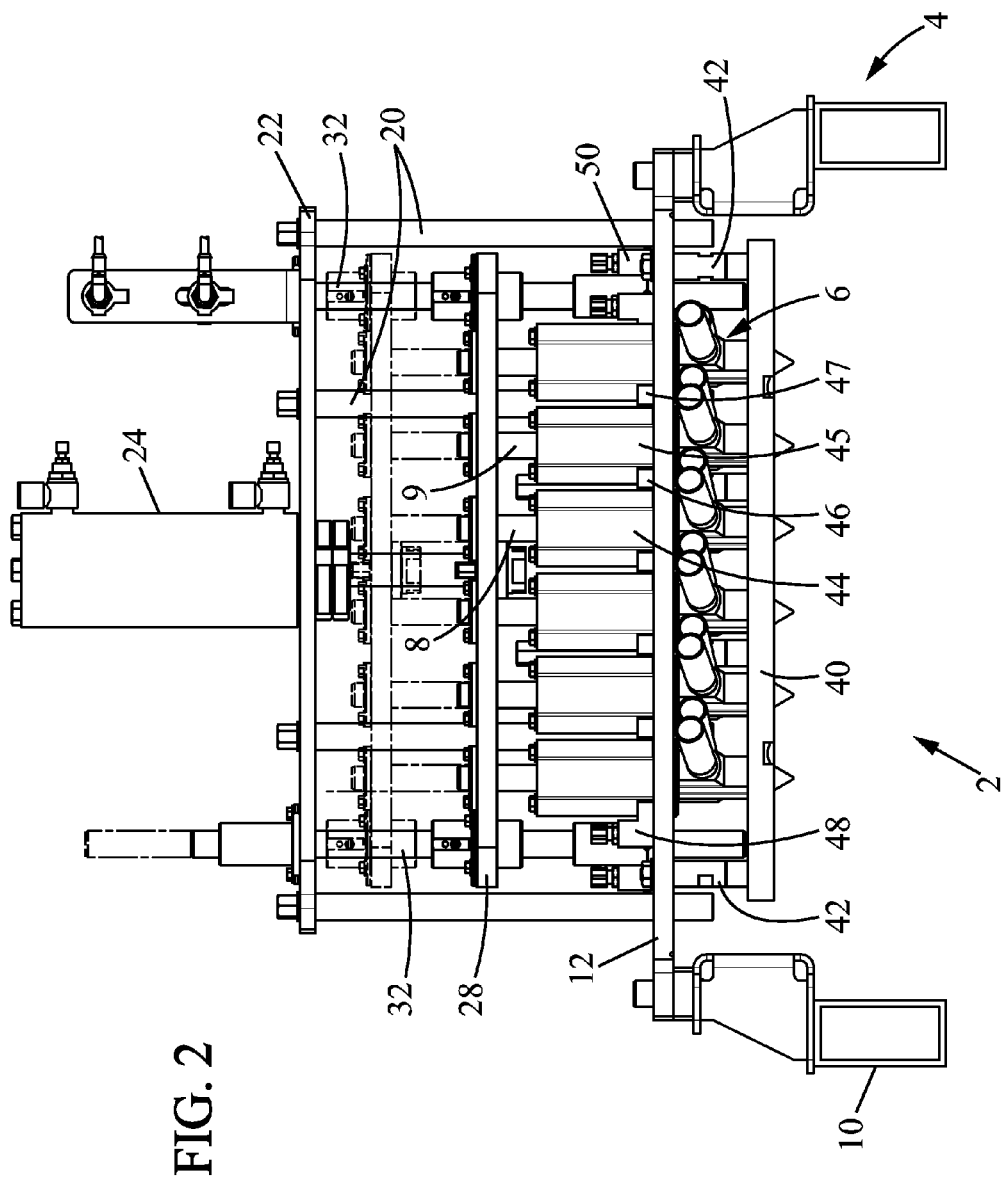
FIG. 2 is a front view of the dispensing device shown in FIG. 1.
Figure 3:
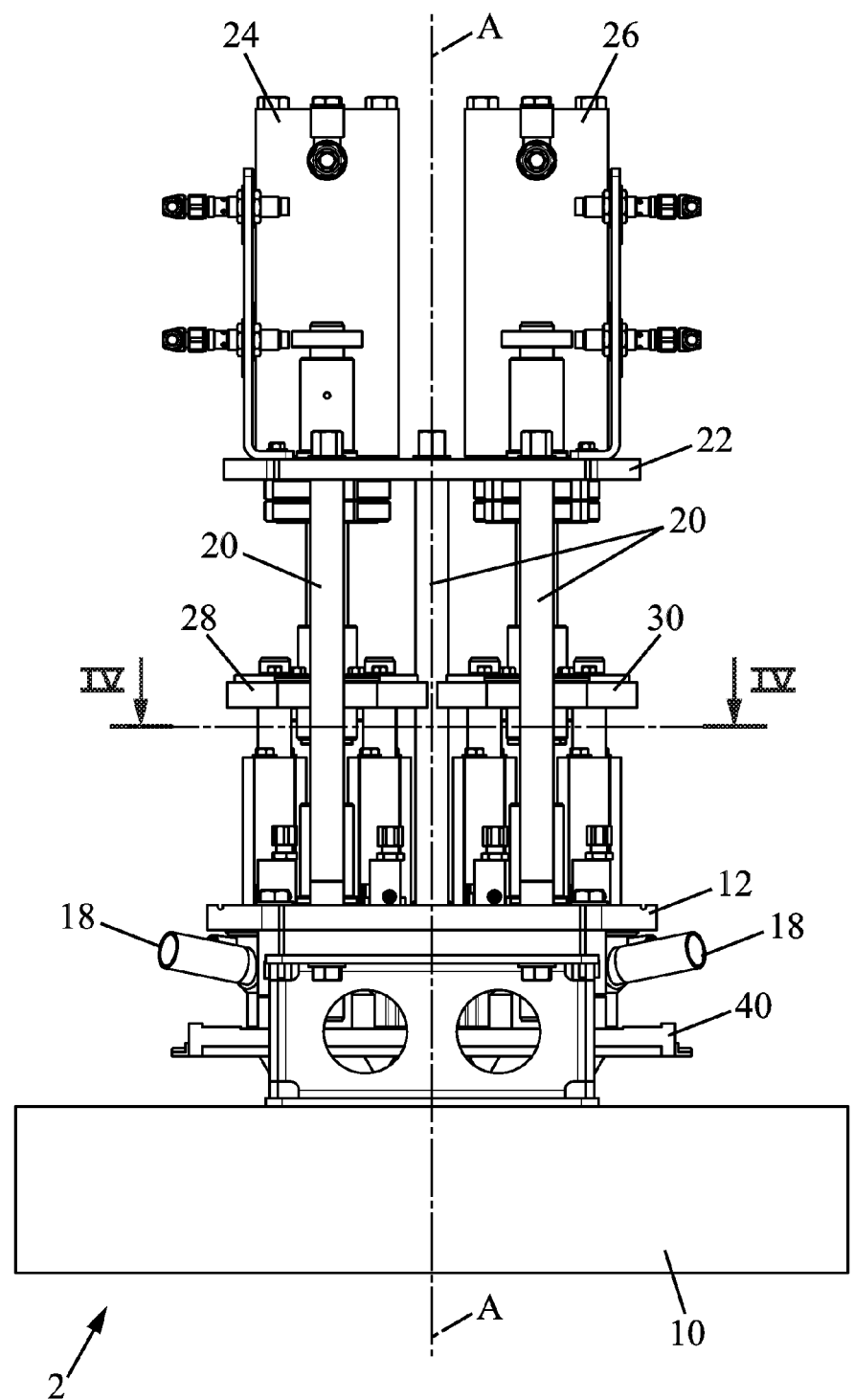
FIG. 3 is a side view of the dispensing device shown in FIG. 1.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

In the following description, the terms "top", "bottom", "lower", "upper", "horizontal", "vertical", "right", and "left" are defined as being when the dispensing device of the invention is arranged as shown in FIG. 1, and are not limiting.

The dispensing device according to the invention is generally referred to as a nozzle plate. It is suitable for dispensing flowable products into containers. Flowable products are, for example, pasty or liquid products or granules. The containers may be packaged into packs where the containers are arranged in one or more rows.

FIGS. 1 to 17 represent an example of a dispensing device according to the invention, suitable for filling a pack of two or four rows of six containers. However, the dispensing device according to the invention can be implemented to dispense products into insulated containers or can be adapted to fill containers arranged in packs having any number of rows and any number of containers per row.

Referring to FIGS. 1 to 4, the dispensing device 2 of the invention is of the type comprising a frame 4, dispensing nozzles 6, 7, and plugs 8, 9 supported by the frame 4.

The frame 4 consists of two feet 10 and a support plate 12 mounted on the two feet 10. The frame 4 has substantially the shape of an arch. It is intended to be arranged above a conveyor belt carrying the containers to be filled. The containers are, for example, yogurt pots.

Figure 5:
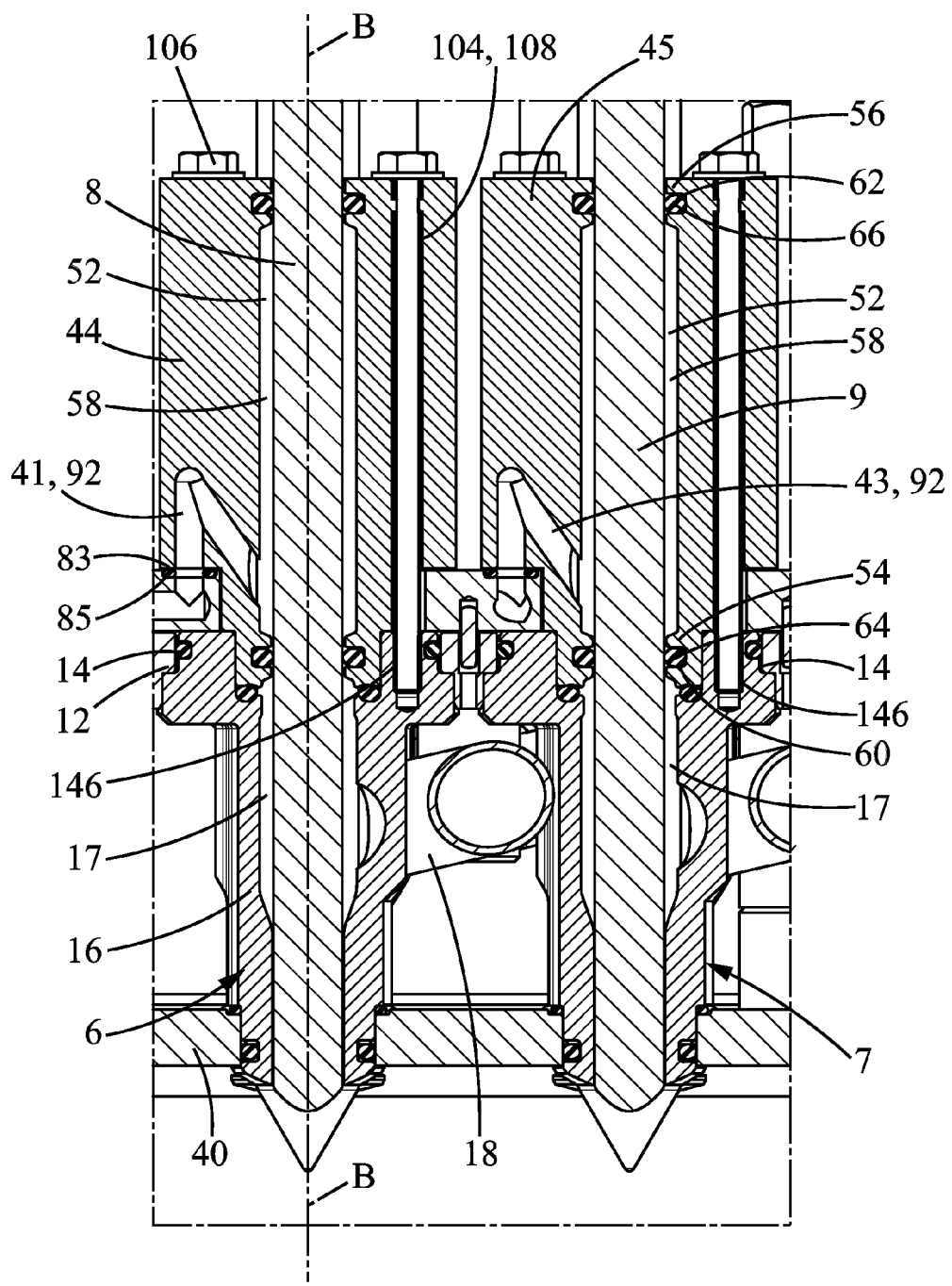
FIGS. 5 to 8 are vertical sectional views along cross-sectional planes V-V, VI-VI, VII-VII, and VIII-VIII of the dispensing device shown in FIG. 1, the cross-sectional planes V-V, VI-VI, VII-VII, and VIII-VIII being shown in FIG. 4.

Referring to FIG. 5, the dispensing nozzles 6, 7 are fitted into holes 14 in the support plate 12, each dispensing nozzle 6, 7 having a nozzle body 16 for dispensing the product to be dispensed, and an entry channel 18, generally referred to as a nozzle tip, connected to the nozzle body 16.

The plugs 8, 9 consist of rods which extend along a main axis B-B. They are adapted to move within the dispensing nozzles 6, 7, between a position where they block the entry channel 18 and a position where the passageway between the entry channel 18 and the nozzle body 16 is unobstructed and allows the flow of product.

The nozzle body 16 has the general shape of a sleeve provided with a central hole 17.

Referring to FIGS. 1 to 4, the dispensing device 2 comprises upper posts 20 attached to the four corners of the support plate 12 as well as along a central longitudinal axis A of said plate, and an actuator-support plate 22 supported by the upper posts 20.

The actuator-support plate 22 supports two actuators 24, 26, for example two cylinders. The two actuators 24, 26 are independent of one another, meaning they can be controlled to carry out different movements.

The dispensing device 2 further comprises two plug-support plates 28, 30 arranged between the support plate 12 and the actuator-support plate 22, and guide columns 32, 34 around which the two plug-support plates 28, 30 slide in order to move the plugs 8 relative to the dispensing nozzles 6, 7.

The plug-support plates 28, 30 lie parallel to the support plate 12, each over half the surface of the principal plane of the support plate 12. One plug-support plate 28, referred to as the front plug-support plate, extends from one side of the central longitudinal axis A-A of the device. The other plug-support plate 30, referred to as the rear plug-support plate, extends from the other side of the central longitudinal axis A-A.

The plug-support plates 28, 30 each carry two rows 36 of plugs 8, 9.

Movement of the front plug-support plate 28 is caused by one actuator 22 and movement of the rear plug-support plate 30 is caused by the other actuator 24, such that the movements of the two plug-support plates can be uncorrelated if the product manufacturer so desires. This functionality can, for example, be used for filling containers of the first two rows with a first product and filling the last two rows with another product.

The guide columns 32, 34 are fixed to the support plate 12 and to the actuator-support plate 22. Two front guide columns 32 are, for example, arranged at the ends of the front plug-support plate 28 and the two rear guide columns 34 are arranged at the ends of the rear plug-support plate 30.

The dispensing device 2 further comprises a protective plate 40 which extends parallel to and below the support plate 12. The protective plate 40 is fixed to the support plate 12 by lower posts 42 arranged at the four corners of the support plate 12 and along the middle longitudinal axis A-A.

The dispensing device 2 further comprises guide blocks 44, 45 adapted to guide the plugs 8, 9, and each having a channel 41, 43 that allows the passage of a maintenance fluid intended for maintaining the plugs 8, 9, couplings 46, 47 that allow the passage of the maintenance fluid from one guide block 44 to the next guide block 45, and inlet blocks 48 and outlet blocks 50 for the maintenance fluid.

Figure 4:
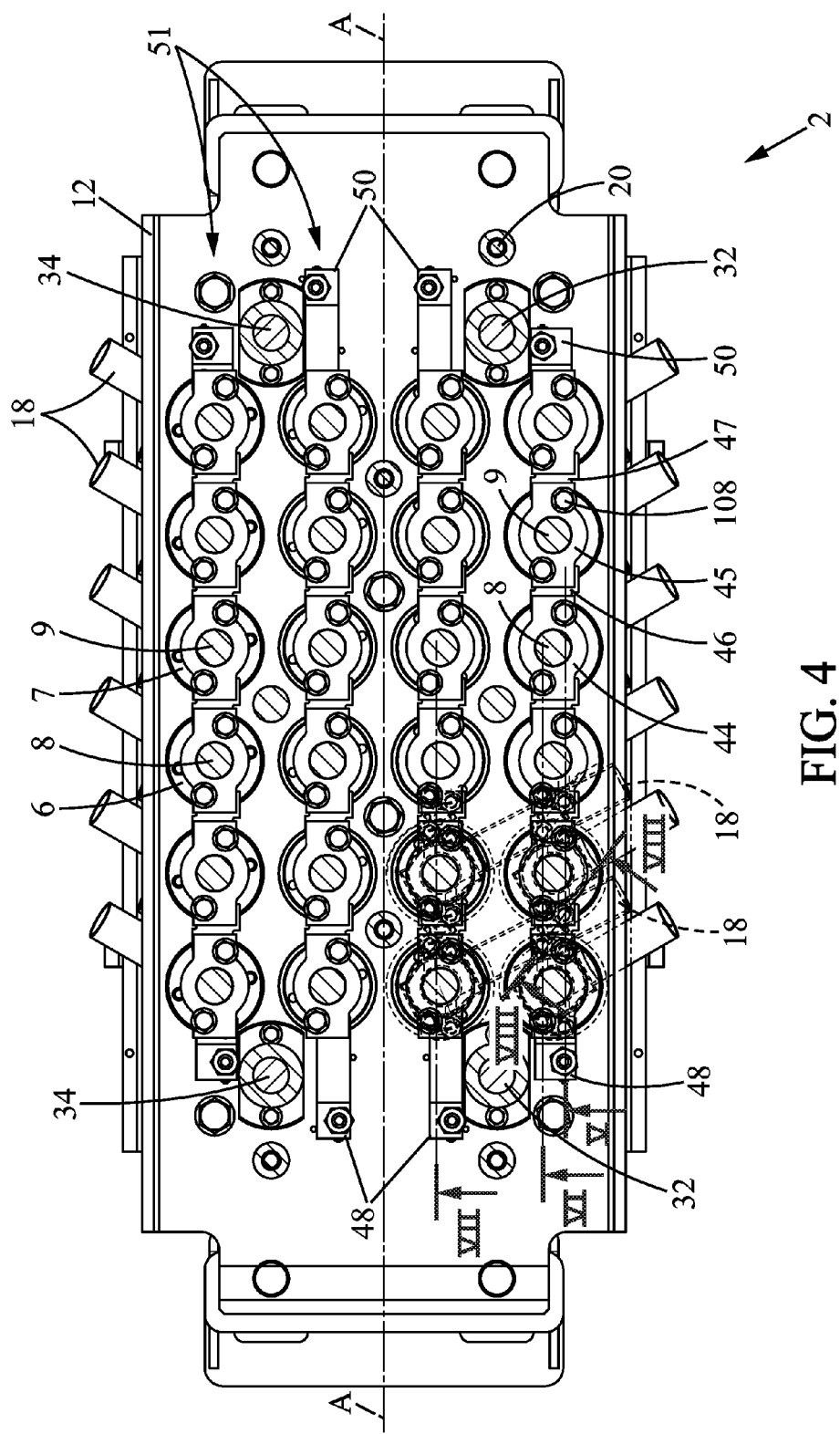
FIG. 4 is a horizontal sectional view along cross-sectional plane IV-IV of the dispensing device illustrated in FIG. 1, the cross-sectional plan IV-IV being shown in FIG. 3.

As shown in FIG. 4, the guide blocks 44, 45 are distributed into four rows 51 arranged adjacent to the two rows of each plug-support plate.

The couplings 46, 47 are arranged, in each row 51, between two adjacent guide blocks 44, 45. The inlet blocks 48 are arranged at one end of each row 51 and the outlet blocks 50 are arranged at the other end of each row 51.

The channels 41, 43 of the guide blocks 44, 45, the couplings 46, 47, the inlet block 48, and the outlet block 50 of each row 51 form a circuit for the maintenance fluid.

The maintenance fluid is composed of either: a cleaning fluid based on water and cleaning agent intended for cleaning the plugs 8, 9, or steam; or a lubricant intended for lubricating the dynamic seals 64, 66.

In practice, the fluid circuit is generally traveled by lubricant. However, once a day or when the manufacturer wishes to change the product to be dispensed into the containers, the fluid circuit is traveled by cleaning fluid.

The inlet blocks 48 and outlet blocks 50 comprises a hose for conveying lubricant, a hose for conveying cleaning fluid, a branching, and valves (not shown).

The guide blocks 44, 45 each comprise a single guide hole 52 for receiving a single plug 8, 9. The guide blocks 44, 45 are spaced apart from each other. They are autonomous. It is possible to create a dispensing device with any number of guide blocks 51 in a row.

As can be seen in FIG. 5, each guide block 44, 45 is mounted on a dispensing nozzle 6, 7. Each guide block 44, 45 has a guide hole 52 positioned parallel to the nozzle body 16, and housing a plug 8, 9.

The guide hole 52 has a constriction 54 in its lower portion and a constriction 56 in its upper portion. The space between the constrictions 54, 56 forms a cleaning and/or lubrication chamber 58 for the plug 8, 9.

The constrictions 54, 56 are provided with a groove 60, 62 containing a dynamic seal 64, 66. The dynamic seal 64 located in the lower constriction establishes a seal between the chamber 58 and the nozzle body 16. The dynamic seal 66 in the upper constriction establishes the seal between the chamber 58 and the space outside the dispensing device 2.

Figure 9:
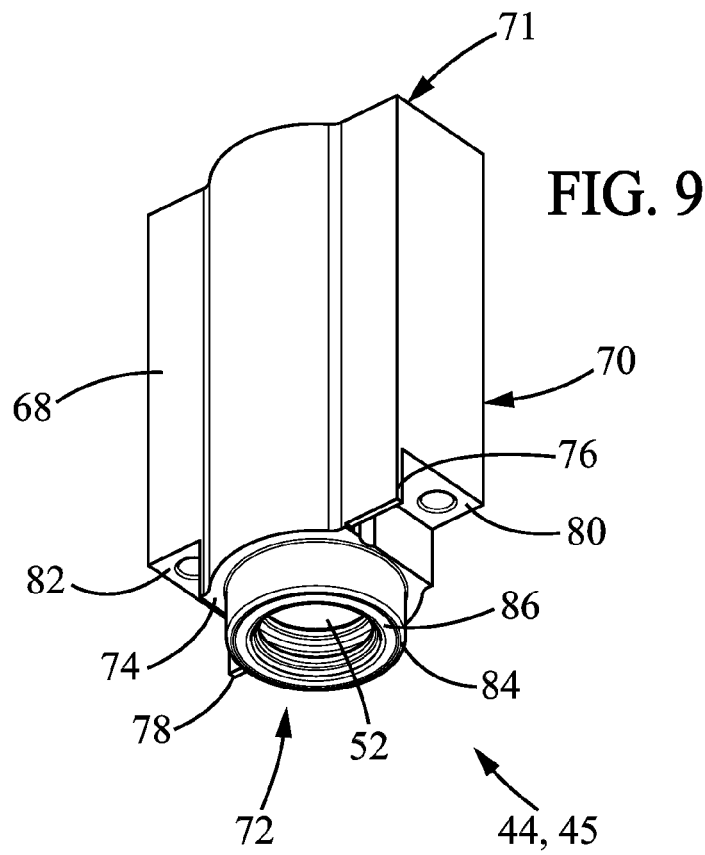
FIG. 9 is a perspective view of a guide block used in the dispensing device shown in FIG. 1.

Referring to FIG. 9, each guide block 44, 45 has substantially the shape of a right rectangular parallelepiped. Each guide block 44, 45 has a front face 68 and a rear face 70, as well as an upper face 71 and lower face 72 traversed by the guide hole 52.

In the embodiment shown, the portion of the front face 68 and the portion of the rear face 70 of the guide block which surround the guide hole 52 are curved.

The lower face 72 of the guide block, referred to as the contact face, comprises an extension 74 of the guide hole 52, two stubs 76, 78 which assist in positioning the couplings 46, 47, and a first lateral contact face 80 and second lateral contact face 82 which are arranged one on each side of the extension 74. The first lateral contact face 80 and the second lateral contact face 82 lie in a plane substantially parallel to the plane of the support plate 12.

The extension 74 has a shoulder 75 which rests on the upper face of the dispensing nozzle.

Figure 6:
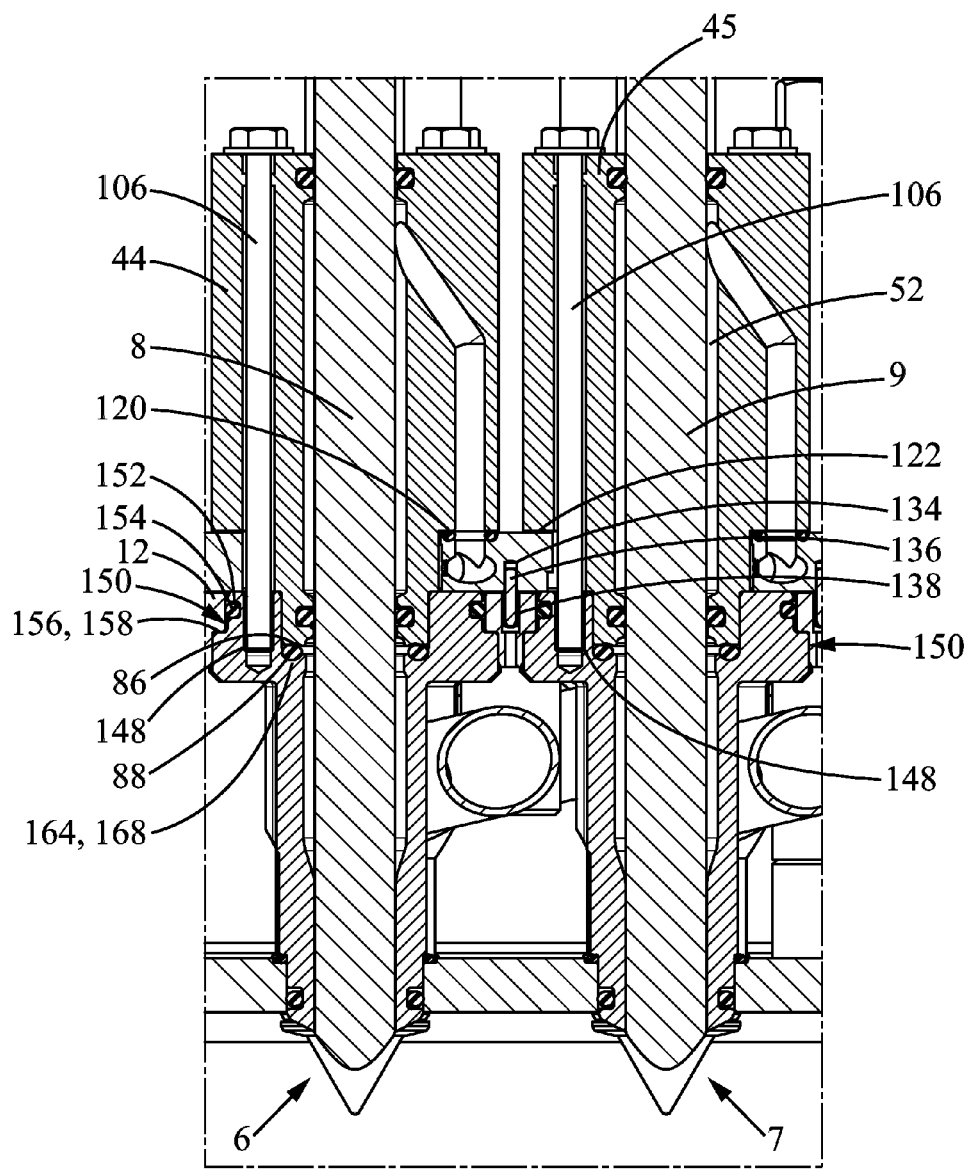
Figure 13:
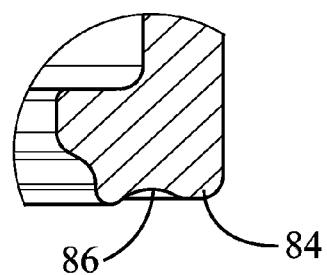
FIG. 13 is an enlargement of a portion of the vertical sectional view of the guide block shown in FIG. 12.

As can be seen in FIGS. 6 and 13, the lower face 84 of the extension is provided with a groove 86. A static sealing device 88 of the O-ring type is arranged in said groove 86.

A stub 76 extends along the first contact face 80 in a vertical plane extending the front face 68. The other bead 78 extends along the second contact face 82 in a vertical plane that extends the rear face 70.

Figure 10:
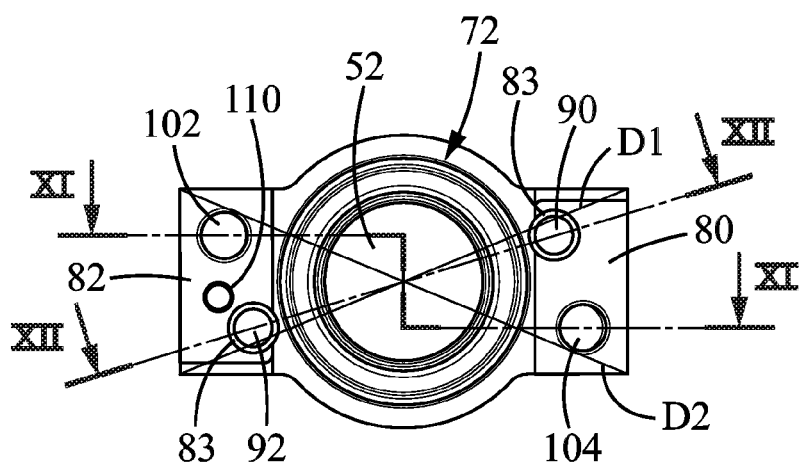
FIG. 10 is a bottom view of the guide block shown in FIG. 9.
Figure 11:
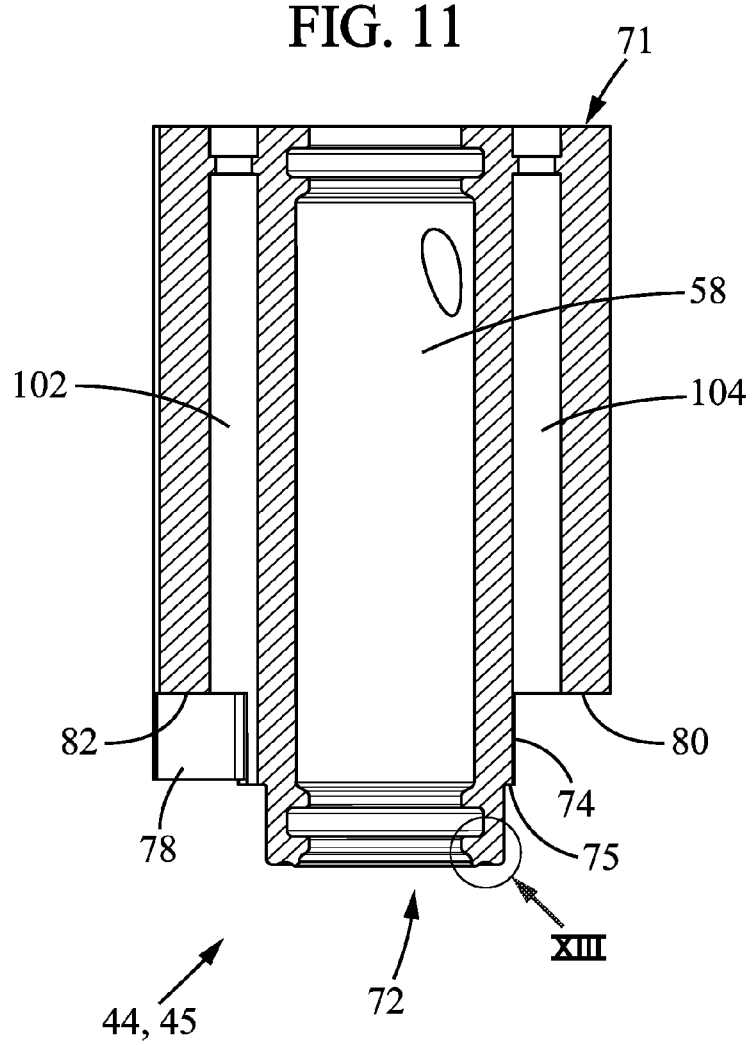
FIGS. 11 and 12 are vertical sectional views along cross-sectional planes XI-XI, XII-XII of the guide block shown in FIG. 9, the cross-sectional planes XI-XI, XII-XII being shown in FIG. 10.
Figure 12:
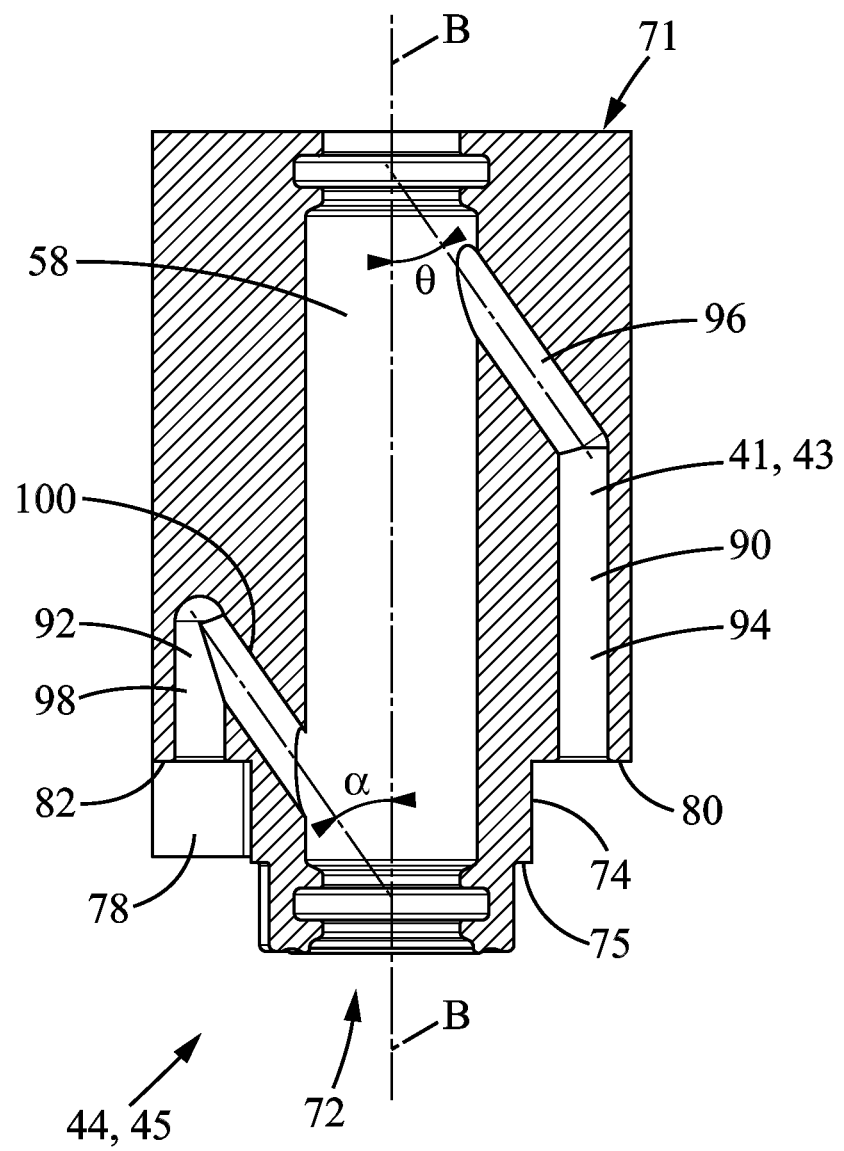

As can be seen in FIGS. 10 and 12, the channel 41 of the guide block is formed by two parts. One part, referred to as the delivery path 90, connects the first contact face 80 to an upper portion of the chamber 58. The cleaning liquid is supplied to the chamber through this delivery path. The other part, referred to as the discharge path 92, connects the second contact face 82 to a lower portion of the chamber 58. The cleaning liquid is discharged from the chamber through this discharge path, as can be seen in FIGS. 5 and 10.

The first contact face 80 and the second contact face 82 are provided with a circular groove 83 around the delivery path 90 and the discharge path 92. These circular grooves 83 are suitable for receiving a static sealing device 85 of the O-ring type.

The delivery path 90 is formed by two rectilinear sections. A first section 94 extends along the main axis B-B and opens onto the first contact face 80. A second section 96 extends along an axis forming a predetermined angle θ with the main axis B-B and opens onto the upper portion of the chamber 58. This predetermined angle θ is, for example, between 55° and 85°.

Advantageously, this configuration allows drilling the second section 96 of the channel using a tool passing through the guide hole 52. The guide block 44, 45 is created as a single piece. It does not comprise a stopper.

Similarly, the discharge path 92 is formed by two rectilinear sections. A first section 98 extends along the main axis B-B and opens onto the second contact face 82. A second section 100 extends along an axis forming a predetermined angle α with the main axis B-B and opens onto the lower portion of the chamber 58.

Finally, the delivery path 90 lies in a plane parallel to the front face 68. The discharge path 92 also lies in a plane parallel to the front face 68 but separate and well apart from the plane containing the delivery path 90. In particular, when considering the lower face 72 of the guide block 44, 45 as a whole, the delivery path 90 and the discharge path 92 end one on either side of the guide hole 52, substantially along a first diagonal D1 of the contact face 72.

The guide block 44, 45 also comprises two attachment holes 102, 104 each traversed by a fastening screw 106, 108 to secure the guide block 44 to the dispensing nozzle 6 arranged below it. The attachment holes 102, 104 and fastening screws 106, 108 together form fastening elements extending parallel to the main axis B-B. When considering the lower face 72 of the guide block 44, 45 as a whole, the two attachment holes 102, 104 end one on either side of the guide hole 52, substantially along a second diagonal D2 of the contact face 72.

Advantageously, this arrangement allows for a compact and stable dispensing device.

Finally, the second contact face 82 of the guide block comprises an assembly-assisting relief element. According to the embodiment shown, this assembly-assisting relief element, visible in FIGS. 7 and 10, consists of a pin 112 and a hole 110 that receives an end of the pin 112. The other end of the pin 112 is housed in a hole 114 provided on a bottom face 116 of the coupling.

The assembly-assisting relief element advantageously allows distinguishing the second contact face 82 which has the opening of the discharge path, from the first contact face 80 which has the opening of the delivery path. This assembly-assisting relief element ensures that when assembling the dispensing device, the guide block 44, 45 is always positioned so that the delivery path 90 of the guide block is oriented toward the inlet block 48 and the discharge path 92 of the guide block is oriented toward the outlet block 50. This arrangement prevents fluid stagnation in the chambers 58.

Figure 14:
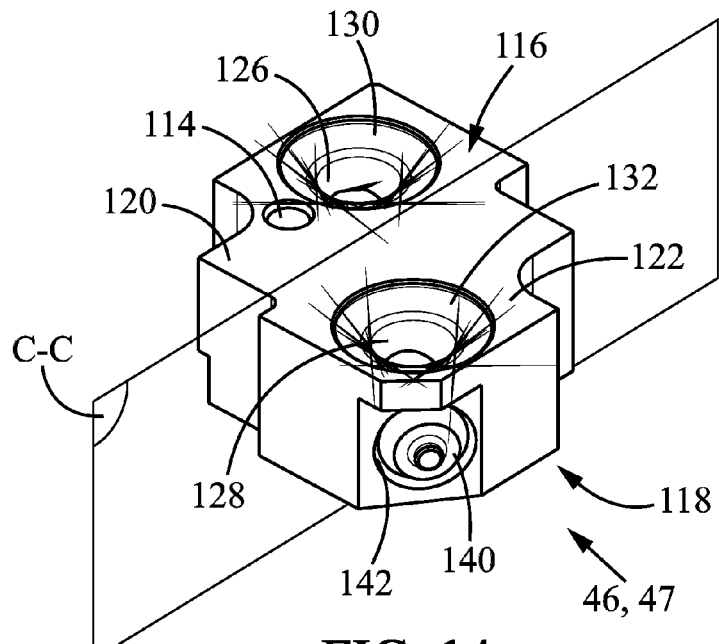
FIG. 14 is a perspective view of the coupling used in the dispensing device shown in FIG. 1.
Figure 15:
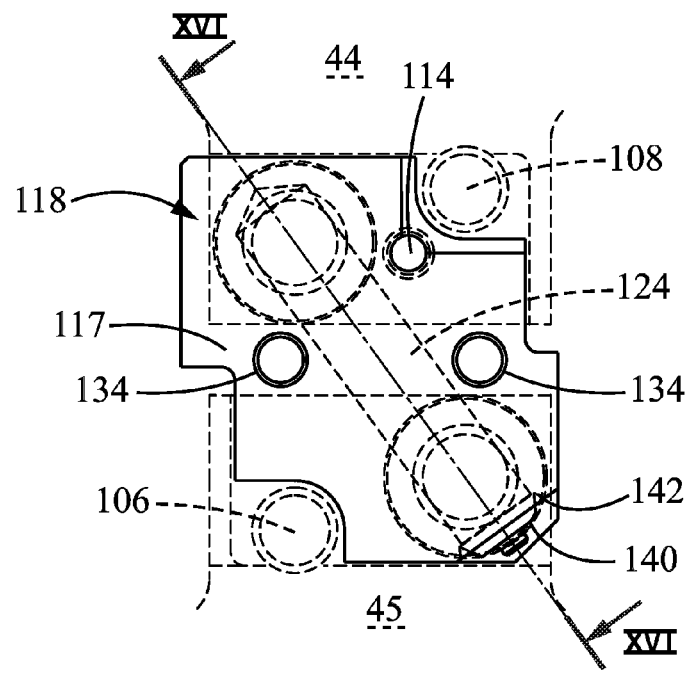
FIG. 15 is a bottom view of the coupling illustrated in FIG. 14, with a portion of the guide blocks and screws represented with dotted lines.
Figure 16:
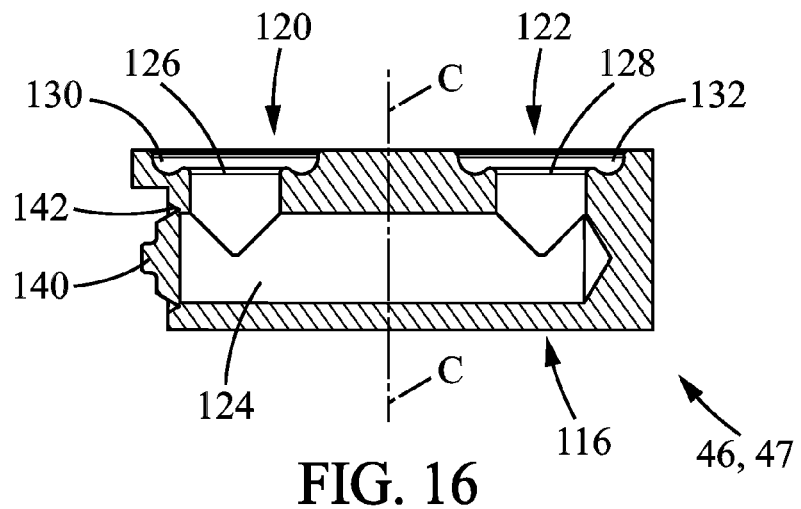
FIG. 16 is a sectional view along cross-sectional plane XVI-XVI of the coupling shown in FIG. 14, the cross-sectional plane XVI-XVI being shown in FIG. 15.

Referring to FIGS. 14 to 16, the coupling 46, 47 comprises a base upper face 116 and a lower face 118 which lie in a plane substantially parallel to the support plate 12.

The first guide block 44 rests on a portion 120 of the base face of the coupling, located on one side of a center plane C-C. The second guide block 45 rests on a portion 122 of the base face located on the other side of the center plane C-C. The center plane C-C traverses a middle portion of the coupling 46, 47. It extends perpendicularly to the support plate 12 and transversely to the dispensing device 2.

Figure 8:
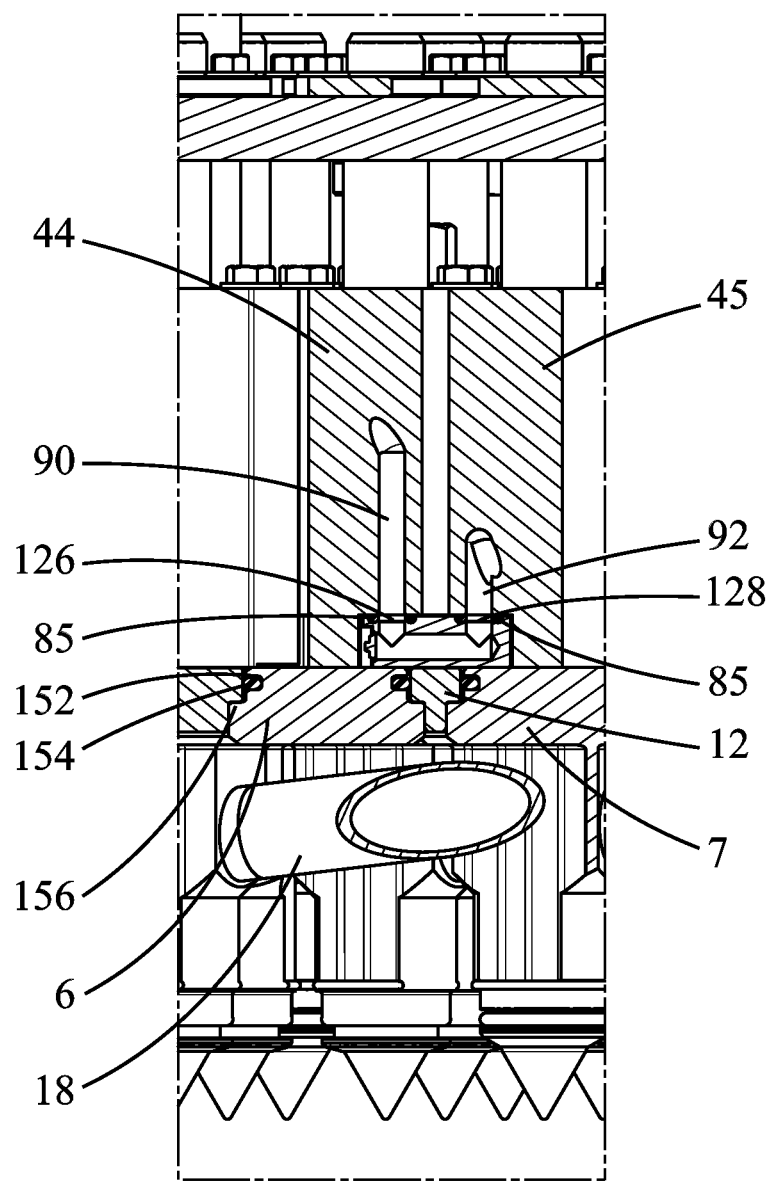

As can be seen in FIGS. 8, 14 and 16, the coupling 46, 7 comprises a channel 124 having a first opening 126 communicating with the delivery line 90 of a first guide block 44, and a second opening 128 communicating with the discharge line 92 of a second guide block 45 arranged next to the first guide block in the row 51. The first opening 126 opens onto a portion 120 of the base face located on one side of the center plane C-C. The second opening 128 opens onto a portion 122 of the base face located on the other side of the center plane C-C.

The base face 116 is provided with two circular grooves 130, 132, each peripheral to an opening 126, 128 of the channel. Each circular groove 130 accommodates a portion of a static sealing device 85. The other portion of this static sealing device 85 is seated in the circular groove 83 of the guide blocks 44, 45. Advantageously, the static sealing devices 85 are compressed by securing the fastening screws 106, 108 to the dispensing nozzles 6.

Figure 7:
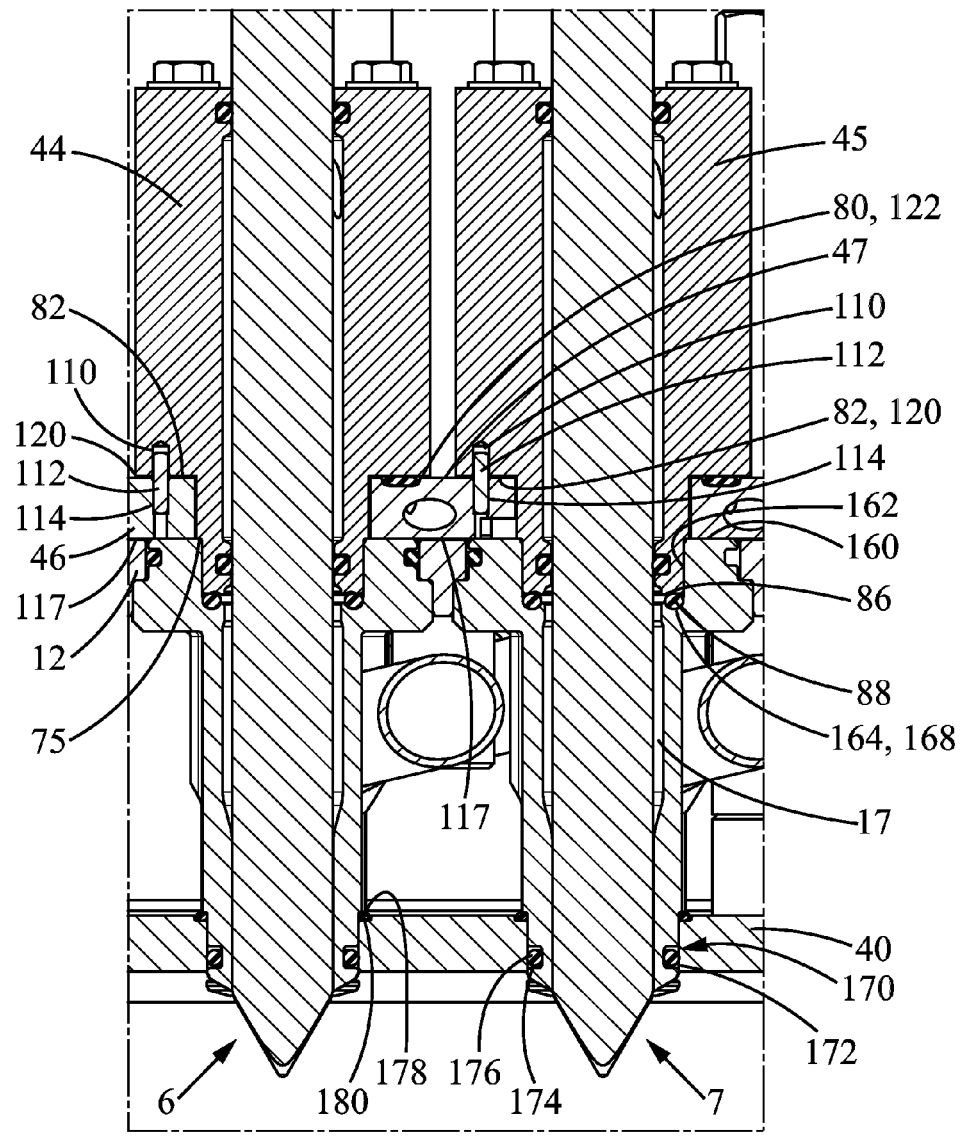

The base face 116 comprises a hole 114 into which the assembly-assisting pin 112 is inserted, as shown in FIGS. 7, 14, and 15.

A middle portion 117 of the lower face 118 of the coupling, illustrated in FIG. 15, comprises two positioning relief elements. These positioning relief elements facilitate positioning and retaining the coupling 46, 47 relative to the support plate 12 when assembling the dispensing device 2.

In the embodiment represented, each positioning relief element, which can be seen in FIG. 6, consists of a hole 134 and a pin 136 partially mounted within the hole 134. The support plate 12 comprises complementary positioning relief elements consisting of holes 138 receiving the other portion of each pin 136.

The channel 124 has a general U-shape, as illustrated in FIG. 16.

When the coupling 46, 47 is made from a mixture of 316L stainless steel, the coupling 46, 47 comprises a stopper 140 that is secured, for example by welding, to a supplemental opening 142 in the channel. This supplemental opening 142 is arranged on a lateral face of the coupling. This supplemental opening 142 is provided solely for reasons related to manufacturing the channel.

Alternatively, the coupling 46, 47 is made of elastomer. In this case, the coupling 46, 47 has no stopper.

The upper portion of the dispensing nozzles 6, 7 is fitted into the holes 14 of the support plate 12.

As can be seen in FIGS. 5 and 6, the upper face of the dispensing nozzles 6, 7 comprises two threaded holes 146, 148 which lie parallel to the main axis B-B. The fastening screws 106, 108 are screwed into the threaded holes 146, 148.

The upper peripheral outer face 150 of the nozzle body comprises a groove 152 in which a seal 154 is mounted, and a shoulder 156 in abutment against a complementary shoulder 158 formed in the holes 14 of the support plate.

The central hole 17 of the nozzle body comprises an enlarged upper portion 162 which houses the extension 74 of the first guide block. A shoulder 164 adjoins this extended portion 162. The extension 74 of the first guide block is supported on this shoulder 164.

Advantageously, this shoulder 164 is provided with a groove 168 in which a portion of the static sealing device 88 is housed. The other portion of this static sealing device 88 is positioned in the groove 86 of the lower face of the extension of the first guide block. As previously stated, the fastening screws 106, 108 fastening the first guide block 44 to the dispensing nozzle 6 compress this static sealing device 88.

As can be seen in FIG. 7, the second contact face 82 of the first guide block 44 presses against an end portion 120 of the base face of a coupling 46. The first contact face 80 of the same first guide block 44 presses against an end portion 122 of the base face of an additional coupling 47. The middle portion 117 of the couplings 46, 47 rests on the support plate 12. The end portion 120 of the coupling 46 and the end portion 122 of the additional coupling 47 rest on the dispensing nozzle 6 positioned under the first guide block 44. The end portion 122 of the opposite end of the additional coupling 47 rests on the neighboring dispensing nozzle 7 positioned under the second guide block 45.

Thus, the end portion 122 of the additional coupling 47 is wedged between the first guide block 44, the dispensing nozzle 6, and the support plate 12. The other end portion 120 of the additional coupling 47 is wedged between the first guide block 44, the neighboring dispensing nozzle 7, and the support plate 12.

The lower portion 170 of the nozzle body is fitted into holes 172 made in the protective plate 40. The lower outer face of the nozzle body 16 comprises a groove 174 in which a static sealing device 176 is seated. The protective plate 40 comprises circular grooves 178, one bordering each hole 172. A seal 180 is mounted in each circular groove 178.

Advantageously, each guide block 44, 45 can be disassembled independently of other guide blocks when a leak is detected in a guide block. Advantageously, each guide block 44, 45 can be disassembled simply by removing two fastening screws 106, 108. Lastly, disassembly of a guide block 44, 45 provides easy access to the dynamic sealing devices of the guide hole, to the static sealing device arranged between guide block and dispensing nozzle, and to the static sealing devices arranged between guide block, coupling, and additional coupling.

Figure 17:
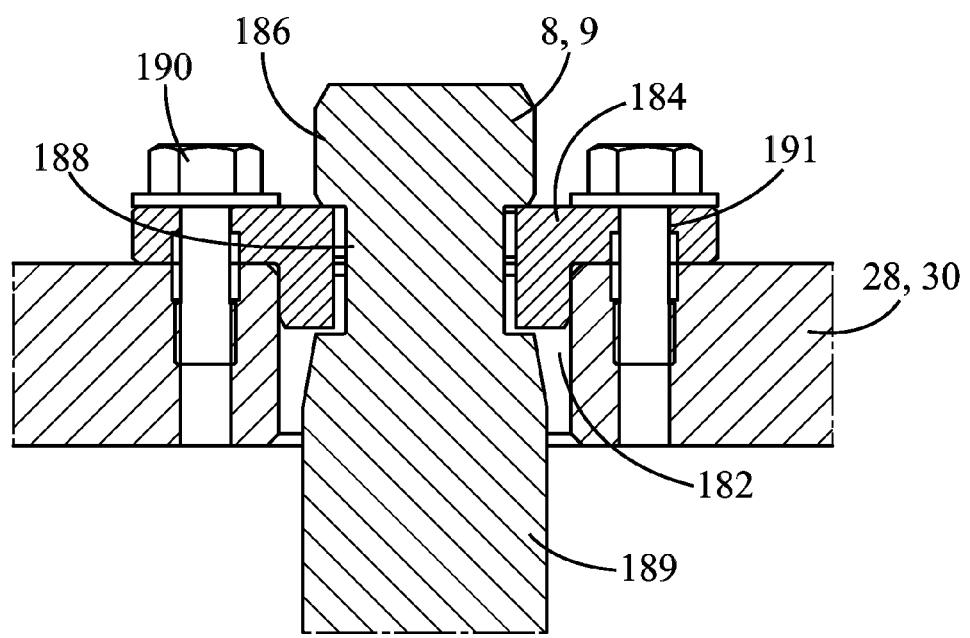
FIG. 17 is a sectional view along cross-sectional plane XVII-XVII of a portion of a plug-support plate of the dispensing device shown in FIG. 1, the sectional plane XVII-XVII being shown in FIG. 1.

Referring to FIG. 17, the plug-support plates 28, 30 each comprise two rows of holes 182 in which the plugs 8, 9 are removably attached using fastening wedges 184.

For this purpose, each plug 8, 9 comprises a rod upper portion 186, a groove 188 receiving a portion of a fastening wedge 184, and a rod lower portion 189 separated from the rod upper portion 186 by the groove 188. The fastening wedges 184 are also secured to the plug-support plates 28, 30 by screws 190 screwed into holes 191.

To facilitate removal of the plugs 8, 9, the diameter of the upper portion 186 is less than or equal to the diameter of the lower portion 189 of the rod. Thus, in order to remove one or more plugs 8, 9, the plug-support plate 28, 30 is placed in the raised position as indicated by dotted lines in FIG. 2. The screws 190 are loosened to ease the fastening wedges 184 away from the plug 8. As a result, the plug 8 slides freely through the hole 182 of the plug-support plate, then through the guide hole 52 of the guide block, and finally through the central hole 17 of the nozzle body. The plugs 8, 9 can therefore easily be removed from underneath the protective plate 40.

Advantageously, the guide blocks 44, 45 can be used in dispensing devices having a different center-to-center spacing, meaning different distances, between a first assembly of plugs 8, guide block 44, and dispensing nozzle 6, and a second assembly of plugs 9, guide block 45, and dispensing nozzle 7. In this case, the couplings 46, 47 used in the two dispensing devices are of different sizes.

As a variant, the coupling is formed by a pipe able to connect to a first contact face of a first guide block and to a second contact face of a second guide block.

As a variant, the couplings are not trapped beneath a portion of the guide blocks but are arranged on an upper face of the guide blocks.

As a variant, the fastening elements 102, 104, 106, 108 comprise a hole and a cone.

As a variant, only the inner shoulder 164 of the nozzle body is provided with a groove 168. In another embodiment, only the lower end face 84 of the first guide block is provided with a groove.

It will be understood that modifications and variations may be effected without departing from the scope of the novel concepts of the present invention, but it is understood that this application is limited only by the scope of the appended claims.

The invention claimed is:

1. A dispensing device for flowable product, said dispensing device comprising:
   a frame comprising a support plate; and
   at least first and second plugs carried by the frame, the first and second plugs being adapted to allow or prevent the flow of product;
   a first guide block supported by the support plate, the first guide block comprising a guide hole adapted to guide the first plug, and a channel in communication with the guide hole, that allows the passage of a maintenance fluid;
   first dispensing nozzles supported by the support plate, said first dispensing nozzles being positioned under the first guide block;
   a second guide block supported by the support plate, the second guide block being isolated from the first guide block, the second guide block having a guide hole adapted to guide the second plug, and a channel for the passage of maintenance fluid; and
   second dispensing nozzles supported by the support plate, said second dispensing nozzles being positioned under the second guide block;
   a coupling supported by the support plate, the connecting in a fluidtight manner the channel of the first guide block to the channel of the second guide block, and permitting the maintenance fluid to go from the channel of the first guide block to the channel of the second guide block, the coupling being wedged on one side between the first guide block and the first dispensing nozzles, and on the other side between the second guide block and the second dispensing nozzles.

2. The dispensing device according to claim 1, wherein the channel of the first guide block opens onto a contact face, which lies in a plane substantially parallel to the support plate.

3. The dispensing device according to claim 1, wherein at least a portion of the first guide block rests on at least a portion of a base face of the coupling, the coupling comprising a channel having a first opening which opens onto the at least a portion of the base face.

4. The dispensing device according to claim 3, comprising an additional coupling having a base face; the other portion of the first guide block resting on at least a portion of the base face of the additional coupling, the channel having a second opening which opens onto the at least a portion of the base face of the additional coupling.

5. The dispensing device according to claim 1, wherein, each dispensing nozzle has a nozzle body adapted to dispense the product and an entry channel coupled to the nozzle body;
   and wherein the support plate comprises openings provided with a shoulder, the first and second dispensing nozzles being fitted into the openings, and
   the first guide block being secured to the first dispensing nozzle by at least one fastening element; the first dispensing nozzle abutting against the shoulder of the support plate; the coupling being wedged between the first guide block, the first dispensing nozzle, and the support plate.

6. The dispensing device according to claim 5, wherein at least a portion of the first guide block rests against at least a portion of a base face of the coupling, the coupling comprising a channel having a first opening which opens onto the at least a portion of the base face, and wherein the dispensing device comprises at least one sealing device interposed between the coupling and the first guide block, and wherein at least one face among the faces of the guide block resting against the coupling and the base face, comprises a circular groove in which the sealing device is seated, the sealing device being compressed by the at least one fastening element.

7. The dispensing device according to claim 5, wherein the channel of the first guide block opens onto a contact face, which lies in a plane substantially parallel to the support plate, the dispensing device comprising two fastening elements fastening the first guide block to the first dispensing nozzle, and wherein the channel of the first guide block comprises a delivery path and a discharge path which open onto the guide hole, one on either side of the hole along a diagonal of the contact face, and wherein the two fastening elements are arranged one on either side of the guide hole, along a second diagonal of the contact face.

8. The dispensing device according to claim 1, wherein each plug comprises at least an upper portion, a groove for receiving a fastening wedge, and a lower portion separated from the upper portion by the groove, and wherein the diameter of the upper portion is less than or equal to the diameter of the lower portion.

9. The dispensing device according to claim 5, comprising a static sealing device arranged between the first guide block and the first dispensing nozzle.

10. The dispensing device according to claim 9, wherein the nozzle body comprises a central hole provided with an internal shoulder, the first guide block comprising a lower end face resting against the internal shoulder, and wherein at least one face among a face of the internal shoulder and the lower end face is provided with a groove, the static sealing device being seated in the groove.

11. The dispensing device according to claim 1, wherein the first guide block is identical to the second guide block.

12. The dispensing device according to claim 1, wherein the coupling comprises a passageway for fluid that is generally U-shaped.

13. The dispensing device according to claim 1, wherein the coupling is made of elastomer.

14. The dispensing device according to claim 1, wherein the guide holes extend along a main axis and wherein the channel comprises at least a section extending parallel to the main axis and a section extending in a direction forming a predetermined angle with the main axis; the predetermined angle being between 55° and 85°.

15. The dispensing device according to claim 1, wherein one among the support plate and the coupling comprises at least one positioning relief element and the other at least one positioning relief element of complementary shape.

16. The dispensing device according to claim 1, wherein the guide hole of the first guide block comprises at least one constriction provided with a groove, and wherein the first guide block comprises at least one dynamic sealing device arranged in the groove and adapted to establish fluidtightness between the first plug and the first guide block.

17. The dispensing device according to claim 2, wherein the contact face of the first guide block comprises an assembly-assisting relief element.

18. The dispensing device according to claim 1, wherein the plugs are arranged in 2n rows where n is an integer greater than 1, the plugs of n row(s) being moved by a first actuator and the plugs of the next n rows being moved by another actuator independent of the first actuator.

19. A set of dispensing devices comprising at least a first dispensing device and second dispensing device according to claim 1, wherein the center-to-center distance between the plugs of the first dispensing device is different from the center-to-center distance between the plugs of the second dispensing device and wherein the guide blocks of the first dispensing device are identical to the guide blocks of the second dispensing device.

20. A dispensing device for flowable product, said dispensing device comprising:
- a frame comprising a support plate;
- at least first and second plugs carried by the frame, the first and second plugs being adapted to allow or prevent the flow of product;
- a first guide block supported by the support plate, said first guide block comprising a guide hole adapted to guide the first plug, and a channel in communication with the guide hole that allows the passage of a maintenance fluid:
- a second guide block supported by the support plate, said second guide block being isolated from the first guide block, the second guide block having a guide hole adapted to guide the second plug and a channel for the passage of maintenance fluid;
- a coupling supported by the support plate, said coupling being adapted to connect in a fluid tight manner the channel of the first guide block to the channel of the second guide block, and permitting the maintenance fluid to go from the channel of the first guide block to the channel of the second guide block; and
- at least first and second dispensing nozzles supported by the support plate, each dispensing nozzle having a nozzle body adapted to dispense the product and an entry channel coupled to the nozzle body;
wherein the support plate comprises openings provided with a shoulder, the first and second dispensing nozzles being fitted into the openings,
the first guide block being secured to the first dispensing nozzle by at least one fastening element, the first dispensing nozzle abutting against said shoulder of the support plate, the coupling being wedged between the first guide block, the first dispensing nozzle, and the support plate,
wherein at least a portion of the first guide block rests against at least a portion of a base face of the coupling, the coupling comprising a channel having a first opening which opens onto the at least a portion of the base face, and wherein the device comprises at least one sealing device interposed between the coupling and the first guide block, and wherein at least one face among the faces of the guide block resting against the coupling and the base face comprises a circular groove in which the sealing device is seated, the sealing device being compressed by the at least one fastening element.

* * * * *